United States Patent [19]

Okada et al.

[11] Patent Number: 4,714,495

[45] Date of Patent: Dec. 22, 1987

[54] SOLVENT, INK AND COATED PAPER FOR CARBONLESS COPYING SYSTEM

[75] Inventors: Yoshio Okada, Matsudo; Masahiro Akatsu; Yohichi Ohira, both ot Iwaki, all of Japan

[73] Assignee: Kupeha Kagaku Kogyo Kabushiki Kaisha, Tokyo, Japan

[21] Appl. No.: 932,570

[22] Filed: Nov. 20, 1986

[30] Foreign Application Priority Data

Apr. 9, 1986 [JP] Japan .................................. 61-81780

[51] Int. Cl.[4] .............................................. C09D 11/00

[52] U.S. Cl. ........................................ 106/21; 106/311

[58] Field of Search .................. 106/21, 311; 346/213; 427/145, 152; 428/320.4

[56] References Cited

FOREIGN PATENT DOCUMENTS

| | | |
|---|---|---|
| 0056177 | 7/1982 | European Pat. Off. . |
| 33056 | 10/1975 | Japan . |
| 116686 | 7/1982 | Japan . |
| 1526353 | 9/1978 | United Kingdom . |
| 2066280 | 7/1981 | United Kingdom . |

OTHER PUBLICATIONS

*Chemical Industry*, vol. 16, No. 5, pp. 18–23, May 1965 "Paper Pulp Technology Times" vol. 14, No. 8, p. 32, 1971.

*Primary Examiner*—Amelia Burgess Yarbrough
*Attorney, Agent, or Firm*—Wenderoth, Lind & Ponack

[57] ABSTRACT

A diisopropylnaphthalene mixture containing 50% or more of 2,7-isomer is substantially odorless, has a low viscosity and exhibits a high dissolving power particularly for an electron-donating color former including a black color former. By coating of micro-capsules of an ink comprising the solvent and a color former on a substrate, a carbonless copying paper which is odorless and excellent in color developing speed including that at lower temperatures, can be obtained.

12 Claims, No Drawings

SOLVENT, INK AND COATED PAPER FOR CARBONLESS COPYING SYSTEM

FIELD OF THE INVENTION AND RELATED ART

This invention relates to a solvent, an ink and a coated paper for carbonless copying system, particularly a solvent, an ink and a coated paper for providing a carbonless copying system which is odorless and excellent in color developing characteristic. Generally speaking, a carbonless copying system or pressure-sensitive copying system is constituted of a manifold or sheets of a carbonless copying paper obtained by coating fine capsules including a solution of a colorless electron-donating substance having a color formation reactivity (hereinafter called "color former" or simply "dye") on the back surface of a paper sheet (hereinafter called "CB paper") and a carbonless copying paper having a developer substance capable of providing a colored product by the reaction with the above color former (hereinafter called "developer") coated on the surface of another paper sheet (hereinafter called "CF paper"); or a manifold or sheets comprising a combination of carbonless copying paper having the above capsules and the above developer coated on both surfaces of the paper sheet respectively (hereinafter called "CFB paper") on the above mentioned CB paper and the above mentioned CF paper; or a carbonless copying paper having the above capsules and developer provided in layers or as a mixture on the same surface of the paper sheet. Any of these carbonless copying systems is pressurized artificially, whereby the capsules at the pressurized portion are broken to cause contact between the color former and the developer to provide a developed color pattern corresponding to the pressurized pattern on a carbonless copying paper.

In the carbonless copying system constituted as described above, the solvent for the color former included in the above capsules, gives an important influence on quality.

In the prior art, as the characteristics demanded for the solvent of these carbonless copying systems, "Chemical Industry" Vol. 16, No. 5, 18–23 (1965) and "Paper Pulp Technology Times" Vol. 14, No. 8, 32 (1971) report the following items:

(1) to have a high dissolving power for a color former;
(2) to provide high color-developing speed, developed color intensity and tone stability after color development.
(3) to be stable against light, heat and chemicals;
(4) to be substantially free from odor;
(5) to be free from toxicity to human bodies and safe; and
(6) to generate no environmental pollution.

On the other hand, referring to the method for utilizing a carbonless copying paper, it has been frequently utilized as a recording paper as represented by use for receiving telex or telefax. However, in recent years, with marked progress in office work by means of computers or high speed printer, the carbonless paper has been primarily utilized as copying paper such as a business form, and this tendency has a serious influence on the characteristics required of the solvent to be used for carbonless copying system.

For example, with respect to a developed color tone of a carbonless copying paper, while relatively inexpensive blue color has been preferred when utilized as a recording paper, black color is becoming employed more frequently for business forms. Usually, for a color former to be used in black color formation, it is required to prepare a color former solution of a high concentration in order to effect formation of a more excellent black color and encapsulate the color former solution, and for this purpose, the solvent is demanded to have a high dissolving power for a black color former.

Further, it is also regarded as important for expanding the field of utilization of carbonless copying paper to lower the production cost of carbonless copying paper and the technique for coating only a small amount of the microcapsules enclosing a color former solution of a high concentration on a paper sheet has been developed in order to decrease the amount of expensive microcapsules employed. This technical change also poses a crucial change for the solvent, and the solvent has been required in recent years to have an ability of dissolving a black color former at a high concentration along with the above tendency to pose importance on black color formation.

On the other hand, as to the environment for using a carbonless copying paper, due to increase in utilization of business forms, the environment is not limited to that in an office always controlled at constant conditions but also extended to the outdoors or a room which may be influenced by the temperature of the outdoors. In other words, it is required that the carbonless copying system should exhibit its functions always in any environment, including low temperatures below the freezing point, particularly to give a high initial color intensity (namely, to give a sufficient color intensity within a short time as short as 30 seconds after application of pressure). Of the functions of a carbonless copying paper, color developing speed is influenced extremely greatly by the characteristics of the solvent, and therefore the importance of a solvent capable of providing a high color developing speed is becoming very high.

Thus, in recent years, as the solvent for carbonless copying paper, there has been demanded a substance capable of exhibiting a high dissolving power for a color former and an excellent color developing speed. However, solvents satisfying these requirements generally have strong odors and cannot satisfy the requirement (4) among the solvent characteristics as mentioned above under the present situation. More specifically, odor is now considered as a very important characteristic for carbonless copying papers utilized as business forms used by indefinite users and, as different from colored carbon paper, along with the colorlessness and cleanness, the odorless characteristic is strongly demanded together with their color forming function. This demand is further increasing with the increase in frequency of use of carbonless copying paper as well as increase in demand for improved environmental conditions.

As the solvent for carbonless copying system of the prior art, substances having relatively low molecular weights have been proposed. For example, there have been proposed 1-dimethylphenyl-1-phenylmethane as disclosed in U.S. Pat. No. 4,130,299 and 1-dimethylphenyl-1-phenylethane, etc., as disclosed in U.S. Pat. No. 3,936,566, etc. However, the common drawback of these solvents is strong odor possessed by the solvents per se, which makes the working environment during production of carbonless copying paper extremely bad and further gives extremely unpleasant feeling to the users of the carbonless copying papers during use thereof. Accordingly, although these solvents appear at a glance to be suitable as solvents for carbonless copying papers to be used as business forms, etc., they do not satisfy the requirement of being substantially odorless.

Partially hydrogenated terphenyl disclosed in U.S. Pat. No. 3,968,301 is produced by hydrogenation of terphenyl, but it is difficult to partially hydrogenate all the terphenyl molecules uniformly during the process of the reaction. Accordingly, partially hydrogenated terphenyl contains unaltered terphenyl and therefore have an odor inherent to terphenyl. Also, partially hydrogenated terphenyl is not fully satisfactory in respect of color developing speed.

On the other hand, among the solvents for carbonless copying paper which have been practically applied in the prior art, dialkylnaphthalenes disclosed in U.S. Pat. No. 3,806,463 and sec-butylbiphenyls disclosed in U.S. Pat. No. 4,287,074 have little unpleasant odor as compared with the solvents as described above, and therefore have excellent performance in that respect. However, these solvents do not suficiently stisfy the increasing demand for an odorless solvent, and they are not necessarily considered as satisfactory solvents because they are inferior in respect of color developing speed.

Thus, none of the solvents for carbonless copying system which have been proposed up to date cannot be said to have no odor and sufficient color developing speed.

There is a proposal to modify the performance of solvents free of unpleasant odor among the practically used solvents as described above without impairing the odorless characteristic by use of an additive substance which can improve the color developing speed. For example, U.S. Pat. No. 4,070,303 proposes to improve the color developing speed of diisopropylnaphthalene by addition of a dibasic acid ester. This method, although providing a recognizable effect of improving the initial color developing speed, will bring about lowering in developed color density due to gradual color fading with lapse of time on account of the basicity of the ester. Also, U.S. Pat. No. 4,383,705 (Japanese Laid-Open Patent Application No. 116686/1982) propose to improve the color developing speed by mixing 1-isopropylphenyl-2-phenylethane with partially hydrogenated terphenyl, and/or diisopropylnaphthalene. The color former solution thus obtained, however, has poor stability and the color former once dissolved will be precipitated when the color former solution is stored for a long time such as one week.

There has been no specific proposal about further removing the odor of the solvent having unpleasant odor as described above, and in an economical carbonless copying paper coated with a small amount of microcapsules, particularly a black color-forming carbonless copying paper set to a higher color former concentration for providing a denser black color, use is still made of a solvent with a relatively low molecular weight having a strong odor.

As described above there has been developed no carbonless copying paper excellent in economy and function by use of substantially odorless solvent yet, and it would be desirable to have an odorless and high performance solvent suitable for these carbonless copying papers.

SUMMARY OF THE INVENTION

A principal object of the present invention is, in view of the state of the art as described above, to provide a solvent, an ink and a coated paper for providing a carbonless copying system which is odorless and improved in color developing speed inclusive of that at low temperatures as well as in color former-dissolving power.

We have studied with the above object and consequently noted the fact that diisopropylnaphthalene, which exhibits less unpleasant odor as compared with other solvents among the solvents for carbonless copying system provided for practical applications but does not necessarily show a sufficient color developing speed, is really not a single compound but a mixture of various isomers. And, in fact, it has been discovered that various isomers of diisopropyl-naphthalene exhibit considerably different characteristics as a solvent for carbonless copying system and also that, among them, 2,7-isomer exhibits ideal characteristics as a solvent for carbonless copying system in all respects of odor, color developing speed and color former dissolving power, thereby to accomplish the present invention.

In accordance with a first aspect of the present invention, there is provided a solvent composition for carbonless copying, comprising a mixture of diisopropylnaphthalene isomers having a content of 2,7-isomer of 50 wt.% or more.

In accordance with a second aspect of the present invention, there is provided an ink composition for carbonless copying, comprising the above solvent composition and an electron-donating color former in an amount sufficient to provide a visible color through contact with an electron-accepting developer.

In accordance with a third aspect of the present invention, there is provided a carbonless copying paper, comprising a substrate and ink capsules coated on a surface of said substrate, said capsules containing the above ink composition.

More specifically, diisopropylnaphthalene (hereinafter abbreviated as "DIPN") is generally produced as a mixture of many isomers by the reaction between naphthalene and propylene. Under the ordinary reaction conditions, of the 10 isomers, 1,2-isomer, 2,3-isomer and 1,8 isomer are not substantially formed, and also any one of the other isomers does not occupy more than a half of the total isomers formed. However, in the prior art, although DIPN has been generally known to be considerably excellent as a solvent for carbonless copying, it has not been practiced to control the solvent characteristic by taking the individual characteristics of the isomers into account.

In the prior art, existence of isomers of DIPN has not totally been disregarded. However, in the prior art, this problem has been considered from the viewpoint of how to produce 2,6-DIPN which is a useful intermediate for naphthalene-2,6-dicarboxylic acid to be used as a polyester precursor with a good efficiency (e.g., Japanese Patent Publication No. 33056/1975), and therein 2,7-DIPN is merely recognized as an undesirable by-product which cannot be separated by distillation from the useful 2,6-DIPN. However, it has been found by us as mentioned previously that 2,7-isomer is essentially odorless, is an isomer which is liquid at normal temperature, exhibits a low liquid viscosity and also possesses ideal charcteristics as a solvent for carbonless copying in respects of color developing speed (particularly, color developing speed at lower temperatures) and color former-dissolving power.

The above mentioned and other objects and features of the invention will be better understood upon consideration of the following detailed description concluding with specific examples of practice. In the following description, "%" and "parts" representing quantity ratios are based on weight unless otherwise noted specifically.

DETAILED DESCRIPTION OF THE INVENTION

Aptitudes of various DIPN isomers for the solvent for carbonless copying are described in more detail below.

2,7-Isomer is not only essentially odorless, but it is also an isomer which is liquid at normal temperature and exhibits a low liquid viscosity. Although the relationship between color developing speed and a solvent characteristic has not yet been fully clarified, a solvent with a lower liquid viscosity is preferred, provided that the solvent has the same chemical structure. This is because, when the solvent is used in a carbonless copying paper, penetration of a color former solution into a solid developer proceeds rapidly to accelerate the color developing action between a color former and a developer when the color former solution is transferred from microcapsules to a developer paper by destruction of microcapsules.

1,3-Isomer and 1,7-isomer have slightly stronger odor as compared with 2,7-isomer, and are solid at normal temperature. On the other hand, 1,4-isomer, 1,5-isomer and 1,6-isomer, while they are more excellent in respect of odor than 1,3-isomer and 1,7-isomer, are also solid at normal temperature and are higher thn 2,7-isomer in viscosity, and therefore they are not preferable as a solvent for carbonless copying as compared with 2,7-isomer. 2,6-Isomer is substantially odorless and can be preferably used when dissolved in another isomer, e.g., 2,7-isomer, without giving appreciable influence on the liquid viscosity of 2,7-isomer. However, 2,6-isomer is a substance which is solid at normal temperature with a melting point of 72° C. and is also by-produced in a large amount and its crystals may sometimes by formed during use of a carbonless copying paper at lower temperatures. For this reason, it is desirable to suppress the amount of this isomer to be mixed to a low level. When considering the physical properties of the respective isomers as described above, it is most preferable to use 2,7-isomer alone. However, in production of DIPN, other isomers than 2,7-isomer are inevitably formed. According to out study, it is preferred that DIPN should comprise 50% or more of 2,7-isomer and preferably have a dynamic viscosity not exceeding 5.8 cst/40° C. and, within this range, the color developing speed and color former-dissolving power can be improved as compared with those of the DIPN solvent for carbonless copying of the prior art.

In the present invention, the content of 2,7-isomer in the DIPN isomer mixture should preferably 51 wt.% or more, preferably 55 wt.% or more, particularly preferably 70 wt.% or more. 2,6-Isomer alone is a substance which is solid at normal temerature, and while it can be dissolved in other isomers, it can be precipitated at lower temperatures. Therefore, it is preferable to limit the concentration of 2,6-isomer in DIPN at a level not higher than 18 wt.%. 1,3-Isomer and 1,7-isomer should preferably be each 7 wt.% or less, particularly 3 wt.% or less with the total amount of both the isomers being preferably 5 wt.% or less. Further, it is preferable that the total amount of 1,4-isomer, 1,5-isomer and 1,6-isomer should not exceed 15 wt.%. The DIPN isomer composition should preferably be such that the respective isomers are within the ranges as specified above and a dynamic viscosity of 5.8 cst/40° C. or less, particularly 5.4 cst/40° C. or less, is provided.

If any other isomer except for 2,7-isomer in DIPN has a concentration higher than that as specified above, the odor becomes stronger or the dynamic viscosity becomes higher undesirably. The color developing speed of a carbonless copying paper with the use of DIPN as the solvent is deeply related to the dynamic viscosity of the solvent DIPN, and the initial color developing speed becomes smaller as the dynamic viscosity becomes higher. When the dynamic viscosity of DIPN is 5.8 cst/40° C. or lower, the color developing rate after 30 seconds is 40% or higher, while it is about 30% in the case of a DIPN with a viscosity of 6 cst/40° C. or higher. This is why the dynamic viscosity of DIPN is desired to be 5.8 cst/40° C. or lower, particularly 5.4 cst/40° C. or lower. As a method for lowering the dynamic viscosity of DIPN having a high dynamic viscosity, there is known a method of adding a diluent with a low liquid viscosity (e.g., dodecylbenzene, high boiling mineral oil), but the color former-dissolving power is remarkably lowered when a diluent is used. However, as described above, the DIPN having a specific isomer composition in the DIPN and having a dynamic viscosity suppressed to a low level can give excellent color developing speed without lowering the color former-dissolving power.

Next, a method for preparation of DIPN isomer mixture of the present invention will be explained.

DIPN is generally prepared according to (1) reaction between naphthalene and propylene, (2) reaction between naphthalene and an aromatic compound having a propyl group, or combination of these in the presence of a solid acid catalyst such as silica-alumina, zeolite, alumina, etc., and an acid catalyst such as aluminum chloride, etc. For the present invention, it is preferable to use the reaction conditions which can form primarily $\beta,\beta$-isomers of DIPN (2,6-isomer and 2,7-isomer) and minimize the formation of $\alpha,\beta$-isomers (1,3-isomer, 1,6-isomer and 1,7-isomer). Accordingly, although the above reaction can generally occur at 100° C. or higher with a solid acid catalyst and 0° C. or higher with aluminum chloride, the temperature range should preferably be 250° to 300° C. in the case of a solid acid catalyst and 50° to 100° C. in the case of aluminum chloride. At a temperature lower than the specified temperature range, $\alpha,\beta$-isomers having relatively strong odor and high viscosity will be abundantly formed. At a tmeperature exceeding the specified temperature range, decomposition of attached propyl group will occur to generate by-products such as methylnaphthalene, ethylnaphthalene, etc., which are causes for generation of odor. The reaction time cannot be determined in a single way, but it may preferably be about 1 to 3 hours for the same reason. As for the reaction pressure, it may be said that the reaction is preferably carried out under an elevated pressure, but there is no special reason for further limitation in addition thereto.

The product obtained as described above contains unaltered naphthalene, monoisopropylnaphthalene and polypropylnaphthalene such as tripropylnaphthalene or more-substituted product in addition to the desired DIPN (about 50% at maximum). Accordingly, the first step of purification for obtaining the DIPN mixture of the present invention is to recover a DIPN distillate fraction (about 300° to 311° C. at normal pressure) from the reaction product. Subsequently, a fraction composed mainly of β,β-isomers (about 305° to 310° C. at normal pressure) is recovered from the DIPN fraction. These separations are conducted by distillation preferably under a reduced pressure, for example, under a reduced pressure of about 30 mmHg, by use of several multi-stage distillation columns of, e.g., 30 stages. By employment of preferable reaction conditions and distillation conditions in combination, a DIPN mixture containing 50% or more of 2,7-isomer can be obtained even at this stage (see Example 1 shown below). In contrast, in the prior art, because the characteristics of the respective isomers have not been fully understood, DIPN containing much α,β-isomers (particularly 1,3-isomer, 1,7-isomer having slightly lower boiling point) has been obtained (see Comparative Example 1 shown below or Table 2 in U.S. Pat. No. 3,806,463), which has left some problems with respect to odor, viscosity characteristic, color developing speed, etc.

The DIPN rich in β,β-isomers obtained as described above itself has substantially completely solved the problem of odor but it may leave a problem in low temperature characteristic because of relatively much 2,6-isomer (less than 50% of the β,β-isomers) which is solid at normal temperature. Accordingly, it is preferable to remove 2,6-isomer as much as possible by centrifugation, filtration, etc., at a low temperature of, e.g., −10° C. to −5° C. Thus, according to the present invention, a DIPN mixture containing 50% or more, preferably 55% or more, more preferably 70% or more of 2,7-isomer can be obtained. The upper limit of 2,7-isomer is determined in view of the purification cost and it is generally 90% or less, particularly 80% or less.

The DIPN mixture thus obtained itself exhibits extremely preferable characteristics as a solvent for carbonless printing and, in fact, it is most preferable to use it alone as the solvent for carbonless copying. However, by utilizing the individual characteristics of its odorless characteristic, dissolving power, color developing characteristic, etc., it can be mixed with a solvent for carbonless copying of the prior art to improve the characteristic of the respective solvent which has been problematic. For example, the present solvent can be combined with a sec-butylbiphenyl solvent to improve its odor. Also, the present solvent can be combined with a hydrogenated terphenyl to improve its color developing characteristic. Further, the present solvent can be added to diarylalkanes such as 1,2-ditolylethane, 1,1-cumylphenylethane, which are good in odor and color developing characteristic but inferior in dissolving power, to improve their dissolving power. In such a case, in order for the improved effect to be exhibited effectively, the DIPN mixture of the present invention should preferably be employed in an amount of 30% or more of the total solvent. Also, when the color former concentration in the ink may be low, the solvents as described above can be diluted with a diluent such as alkylbenzenes, and mineral oils. The lower limit of dissolving power required may be practically 1%, preferably about 3% with CVL (crystal violet lactone, 20° C.) as the standard.

The ink composition for carbonless copying of the present invention can be obtained by mixing an electron-donating color former with the solvent of the present invention comprising mainly the DIPN mixture as described above. As the electron-donating color former, all of the so-called leuco-dyes can be preferably used, including phenothiazine type lactone compounds such as benzoyl leuco-methylene blue, triphenylmethane type lactone compounds such as crystal violet lactone, malachite green lactone; diaminofuran derivatives, fluorane type compounds, spiropyrane type compounds. Further, by utilizing the high color former-dissolving power of the solvent, a black color former is preferably used when a high concentration ink is particularly desired. Examples of such black color formers may include one-dye black color former which can form black color alone such as PSD-150 produced by Shinnisso Kako K.K., 3-diethylamino-6-methyl-7-anilinofluorane, 3-diethylamino-6-methyl-7-(4'-methylanilino)fluorane, 3-diethylamino-6-methyl-7-(2',4'-dimethylanilino)fluorane, 3-diethylamino-6-methyl-7-p-n-octylanilinofluorane, 2-di(α-phenylethyl)-amino-6-diethylaminofluorane, 3-diethylamino-6-methyl-7-p-butylanilinofluorane, 2-p-dodecylanilino-3-methyl-1-diethylaminofluorane, 2-di-α-phenylethylamino-6-ethyl-p-toluylaminofluorane, etc., either singly or in combination with an auxiliarily small amount (e.g., about 20%) of a blue color former such as CVL. Furthermore, a black color former comprising a mixture of 3 primary colors of red, blue and yellow (or instead, green) may preferably be used. These black color formers may preferably be used to provide inks of high concentrations of 3 to 20 parts per 100 parts of the solvent and they are most preferably used in combination with the solvent of the present invention excellent in color former-dissolving power.

In order to form a carbonless copying paper from the ink for carbonless copying of the present invention as described above, the above ink is formed into microcapsules of, for example, 2 to 20 microns according a conventional method such as phase separation, interfacial polymerization, in-situ polymerization, etc. Examples of the wall material may include polyamide resin, polyurethane resin, urea-formalin condensed resin, melamine-formalin condensed resin, gelatin, etc. The wall material is used generally in an amount of 20% of microcapsules in most cases.

The ink capsules are dispersed in a dispersion or a slurry form (capsule concentration is, for example, 15 to 20%) containing a capsule protective agent such as oxidized starch, carboxymethyl cellulose, etc., a binder such as polyvinyl alcohol, wax, photocurable resin, solvent-soluble resin, etc., and applied as a coating by a coating means such as air knife coater, roll coater, etc., on various kinds of paper substrate to give the coated paper of the present invention. The coating amount may be determined on the basis of the absolute amount of the color former necessary for giving a recorded image with a sufficient density. For example, it is generally 50 to 500 $mg/m^2$, more specifically of the order of about 200 $mg/cm^2$ in the case of black and of about 100 $mg/cm^2$ in the case of other colors such as blue, as a rough standard.

The carbonless copying paper of the present invention is inclusive of, in addition to a CB paper obtained as described above, a CFB paper having a coating of an electron-accepting developer for developing the above color former by contact therewith on the side opposite to the coated surface of the above CB paper, and self-contained carbonless paper having a developer contained together with the microcapsules in the binder coated.

The developer may include all of the known developers for use in carbonless printing, and inorganic solid acids such as bentonite, clay, active clay, acid clay, etc., may also be used. Particularly, for such reasons as exhibiting sufficient color developing performance with a small coated amount, having excellent light resistance and water resistance of color developed images, etc., it is more preferable to use an acidic resinous developer comprising a mixture with a binder such as condensed resins of p-alkyl-substituted phenols such as (p-phenylphenol, p-nonylphenol, p-octylphenol, etc.) with formalin, maleic acid-rosin resins, hydrolyzed styrene-maleic anhydride copolymers and ethylene-maleic anhydride copolymers, hydrolyzed vinyl methyl ether-maleic anhydride copolymers, carboxypolymethylene, or metal salts of hydroxybenzoic acid (particularly zinc salt), etc. The ink containing the solvent having excellent dissolving power of the present invention also has a function of promoting color development by dissolution of these resinous developers.

The carbonless copying paper of the present invention as described above can also be used in a manifold form, if desired, comprising combination of CB paper, CFB paper and CF paper having a developer layer provided on one surface, similarly as practiced for conventional carbonless copying papers.

As described above, according to the present invention, there are provided a DIPN-type solvent for carbonless copying which is excellent in odorless characteristic, low viscosity characteristic, particularly color developing speed at low temperatures as well as color former-dissolving power including particularly compatibility with a black color former by containing 50% or more of the 2,7-isomer; an ink containing the solvent; and a carbonless copying paper coated with the ink in a microencapsulated form.

The present invention is described in more detail by referring to the following examples and comparative examples.

EXAMPLE 1

This example shows a method for preparation of a solvent composed mainly of 2,7-diisopropylnaphthalene.

A pressure autoclave of 10-liter capacity (produced by Nitto Hannoki K.K.) was charged with 4.2 kg of naphthalene and 700 g of a silica-alumina catalyst N-633 (produced by Nikki Kagaku K.K.), and the mixture was heated under stirring to 280° C. and the reaction was continued until 2.7 kg of propylene supplied from a propylene bomb connected through a connecting piper was consumed. Further, the reaction was continued at the same temperature and 1 hour later, heating was stopped, followed by cooling.

The catalyst was filtered out from this reaction product, and the reaction mixture was rectified by a rectifying distillation equipment to obtain 1.56 kg of a mixture of diisopropylnaphthalene isomers. The 2,7-diisopropylnaphthalene concentration in this mixture was found to be 51%. Next, this mixture was cooled to −10° C. and the crystals of 2,6-diisopropylnaphthalene formed were removed to obtain a solvent with a concentration of 2,7-diisopropylnaphthalene of 71%. According to the result measured by FID gas chromatography by use of DC-500 column of 45 m at 300° C., the solvent had the following composition:

| | |
|---|---|
| 1,3-diisopropylnaphthalene | 0.06% |
| 1,7-diisopropylnaphthalene | 1.98 |
| 2,7-diisopropylnaphthalene | 73.46 |
| 2,6-diisopropylnaphthalene | 15.81 |
| 1,6-diisopropylnaphthalene | 8.44 |
| 1,4-diisopropylnaphthalene | 0.25 |
| 1,5-diisopropylnaphthalene | 0.0 |

Also, this solvent showed the following physical properties:

Boiling point: 308°-310° C. (760 mmHg)
Specific gravity ($d_4$/15° C.): 0.951
Refractive index ($n_D$/25° C.): 1.566
Viscosity (cst/40° C.): 5.24

EXAMPLE 2

This example shows the color former-dissolving power of the solvent according to the present invention.

100 ml of each of the solvent composed mainly of 2,7-diisopropylnaphthalene prepared according to the method as described in Example 1 was heated to 150° C., and 30 g each of a fluorane-type black color former (PSD-150, produced by Shinnisso Kako K.K.), a crystal violet lactone-type blue color former, a red color former and an orange color former were separately dissolved therein.

Next, these solutions were left to stand in a thermostatic tank of 20° C. and the concentrations of color formers in the solution after 1 day, 3 days and 7 days (only after 1 day for red and orange color formers) were measured. The results are shown in the following Table.

TABLE 1

| Color Former | 1 day | 3 days | (g/100 ml) 7 days |
|---|---|---|---|
| PSD-150 Black | 24.5 | 16.4 | 15.2 |
| CVL | | | |
| Blue | 12.0 | 7.5 | 6.6 |
| Red | 3.6 | | |
| Orange | 25.6 | | |

From the above Table, it can be seen that the solvent of the present invention exhibits stable dissolving power for a long time particularly for a black color former, and also exhibits practically satisfactory dissolving power for color formers of other colors.

EXAMPLE 3

This example shows the organoleptic test of odor of the solvent according to the present invention.

30 ml of the solvent composed mainly of 2,7-diisopropylnaphthalene prepared according to the method as described in Example 1 was sampled in a wide-mouth bottle.

As the result of organoleptic test conducted by panels of indefinite men and women each of 20 members as to whether any odor is present or absent, the number of persons who answered "odor present" were only two of the total of 40 members. This result represents that the solvent of the present invention is extremely excellent in odorless characteristic.

EXAMPLE 4

This example shows the test of initial color developing speed of the carbonless copying paper according to the present invention.

Preparation of microcapsules:

By use of the solvent composed mainly of 2,7-diisopropylnaphthalene obtained as described above, microcapsules were prepared according to the method as described below.

The reaction was carried out at 70° C. by mixing 630 g of melamine with 1620 g of formalin (37% aqueous formaldehyde solution, hereinafter the same) adjusted with 2% aqueous NaOH solution to pH=9.0. After the melamine was dissolved, 2250 g of water was immediately added, and stirring was continued for 3 minutes to prepare an aqueous solution of melamine-formaldehyde prepolymer. Separately, 1460 g of formalin adjusted to pH=8.5 with triethanol amine and 600 g of urea were mixed and the reaction was carried out at 70° C. for 1 hour to obtain an aqueous solution of urea-formaldehyde prepolymer. A mixture of 1620 g of 37% aqueous formaldehyde solution and 600 g of urea was stirred and, after the mixture was adjusted to pH 8.8 with addition of triethanolamine, the reaction was carried out at 70° C. for 30 minutes.

To 400 g of the reaction mixture were added 24 g of water and 30 g of tetraethylenepentamine, and the mixture was adjusted to pH 3 with 15% hydrochloric acid under stirring at 70° C. Since the pH was lowered, the reaction product was adjusted again to pH 3 with addition of 10% aqueous caustic soda and the reaction was continued at a temperature lowered to 55° C. and the reaction mixture was neutralized with 10% aqueous caustic soda solution when the viscosity became 200 cps, followed by addition of 4 kl of water, to obtain an aqueous solution of a water-soluble cationic urea resin.

A mixture of 1000 g of the melamine-formaldehyde prepolymer aqueous solution, 500 g of the urea formaldehyde prepolymer aqueous solution and 1580 g of the cationic urea resin aqueous solution as described above, 620 g of water and 10 g of triethanol-amine, was adjusted to pH=5.2 with 10% aqueous citric acid solution, and then 30 g of 10% aqueous Neopelex solution (surfactant produced by Kao Atlas K.K.) was added to provide a solution A.

Separately, 1300 g of PSD-150 (black color former produced by Shinnisso Kako K.K.) was dissolved in the above solvent composed mainly of 2,7-diisopropylnaphthalene to provide a solution B. Into the solution A, 1000 ml of the solution B was emulsified by a homogenizer to form emulsified particles of 2 to 8 microns and then 1% citric acid solution was added under gentle stirring at a temperature maintained at 30° C. to adjust pH to 3.6. Then, the emulsion was stirred for 1 hour and 2000 ml of water was added thereto. Further, after 3 hours, 20% citric acid was added to adjust pH to 3.0 and stirring was continued for 20 hours to obtain a slurry of microcapsules.

Preparation of carbonless copying paper:

300 g of the microcapsules obtained as described above were added into 600 ml of a 10% solution of PVA (polyvinyl alcohol, produced by Kuraray K.K.) separately prepared and stirred well to obtain a dispersion. The dispersion was applied onto a paper with a basis weight of 45 g/m$^2$ to a coating amount of the microcapsules of 2.2 g/m$^2$. This coated paper was combined with a developer paper coated in a conventional manner with a condensation resin of p-octylphenol and formalin at a ratio of 0.8 g/m$^2$ to obtain a carbonless copying paper.

First, the carbonless copying paper prepared according to the above method was subjected to color developing by a typewriter produced by Olivetti Co. under normal environment and, after stored in a dark place for 24 hours, the developed color density was measured by a reflective color densitometer produced by McBeth Co.

On the other hand, the same carbonless copying paper was developed similarly under the environment of $-5$° C., and the changes in density immediately after color development were measured by the same reflective color densitometer and the relative color developing rate at the respective times elapsed were determined with the developed color density at normal temperature for 24 hours as being 100.

The results are shown in Table 2. It can be seen that a sufficient color developing performance was exhibited even at an initial period of 30 seconds.

TABLE 2

| Elapsed time | 30 sec. | 1 min. | 1 hr. | 24 hrs. |
|---|---|---|---|---|
| Color developing rate | 43% | 50% | 82% | 100% |

In the following, as comparative examples, the results of the test performances as the solvent for carbonless copying paper of diisopropylnaphthalenes containing isomers outside the range of the present invention.

COMPARATIVE EXAMPLE 1

A pressure autoclave of 10 liter capacity (produced by Nitto Hannoki K.K.) was charged with 4.2 kg of naphthalene and 700 g of a silica-alumina catalyst N-633 (produced by Nikki Kagaku K.K.), and the mixture was heated under stirring to 230° C. and the reaction was continued until 2.7 kg of propylene supplied from a propylene bomb connected through a connecting pipe was consumed. Further, the reaction was continued at the same temperature, and 1 hour later, heating was stopped, followed by cooling.

From this reaction product, the catalyst was filtered out and the reaction mixture was rectified by a rectifying distillation equipment to obtain 882 g of a mixture of diisopropylnaphthalene isomers.

This solvent had the following composition:

| | |
|---|---|
| 1,3-diisopropylnaphthalene | 40.82% |
| 1,7-diisopropylnaphthalene | 29.42 |
| 2,7-diisopropylnaphthalene | 3.60 |
| 2,6-diisopropylnaphthalene | 4.31 |
| 1,6-diisopropylnaphthalene | 3.16 |
| 1,4-diisopropylnaphthalene | 2.91 |
| 1,5-diisopropylnaphthalene | 0.92 |

Also, this solvent showed the following physical properties:

Boiling point: 305°-308° C. (760 mmHg)

Specific gravity ($d_4$/15° C.): 0.959

Refractive index ($n_D$/25° C.): 1.561

Viscosity (cst/40° C.): 6.74

For this solvent, organoleptic test of odor was conducted according to the same method as practiced in Example 3. As a result, 28 members of 40 members judged that odor was present. Thus, this solvent was found to be inferior with respect to odor as compared with the solvent of the present invention as obtained in Example 1.

Also, a carbonless copying paper was prepared by use of this solvent and tested for its initial color developing performance in the same manner as in Example 4. As a result, the color developing rate at 30 seconds was found to be 29% relative to the developed color density after 24 hours at normal temperature in Example 4 as being 100. Thus, this solvent was inferior in color developing performance compared with the solvent of Example 1.

COMPARATIVE EXAMPLE 2

A pressure autoclave of 10 liter capacity (produced by Nitto Hannoki K.K.) was charged with 4.2 kg of naphthalene and 700 g of a silica-alumina catalyst N-633 (produced by Nikki Kagaku K.K.), and the mixture was heated under stirring to 280° C. and the reaction was continued until 2.7 kg of propylene from a propylene bomb connected through a connecting pipe was consumed. Further, the reaction was continued at the same temperature, and 1 hour later, heating was stopped, followed by cooling.

From this reaction product, the catalyst was filtered out and the reaction mixture was rectified by a rectifying distillation equipment to obtain about 1.48 kg of a mixture of diisopropylnaphthalene isomers.

This solvent had the following composition:

| | |
|---|---|
| 1,3-diisopropylnaphthalene | 2.23% |
| 1,7-diisopropylnaphthalene | 3.30 |
| 2,7-diisopropylnaphthalene | 45.14 |
| 2,6-diisopropylnaphthalene | 40.96 |
| 1,6-diisopropylnaphthalene | 7.33 |
| 1,4-diisopropylnaphthalene | 1.69 |
| 1,5-diisopropylnaphthalene | 0.25 |

However, this diisopropylnaphthalene mixture, when left to stand at normal temperature (20° C.), resulted in crystals of 2,6-diisopropylnaphthalene and was not suitable as a solvent for carbonless copying paper.

COMPARATIVE EXAMPLE 3

A pressure autoclave of 10 liter capacity (produced by Nitto Hannoki K.K.) was charged with 4.2 kg of naphthalene and 700 g of a silica-alumina catalyst N-633 (produced by Nikki Kagaku K.K.), and the mixture was heated under stirring to 200° C. and the reaction was continued until 2.7 kg of propylene from a propylene bomb connected through connecting pipe was consumed. Further, the reaction was continued at the same temperature, and 1 hour later, heating was stopped, followed by cooling.

From this reaction product, the catalyst was filtered out and the reaction mixture was rectified by a rectifying distillation equipment to obtain 1.13 kg of a mixture of diisopropylnaphthalene isomers.

This solvent had the following composition:

| | |
|---|---|
| 1,7-diisopropylnaphthalene | 0.90% |
| 2,7-diisopropylnaphthalene | 21.33 |
| 2,6-diisopropylnaphthalene | 27.19 |
| 1,6-diisopropylnaphthalene | 21.36 |
| 1,4-diisopropylnaphthalene | 16.68 |
| 1,5-diisopropylnaphthalene | 12.54 |

Also, this solvent showed the following physical properties:

Boiling point: 308°-310° C. (760 mmHg)
Specific gravity ($d_4/15°$ C.): 0.963
Refractive index ($n_D/25°$ C.): 1.567
Viscosity (cst/40° C.): 6.21

A carbonless copying paper was prepared by use of this solvent and tested for its initial color developing performance in the same manner as in Example 4. As a result, the color developing rate at 30 seconds was found to be 32%. Thus, this solvent was found to be inferior in color developing performance as compared with the solvent of the present invention prepared according to the method as described in Example 1.

COMPARATIVE EXAMPLE 4

For improving the initial color developing rates of the diisopropylnaphthalene mixture used in Comparative Examples 1 and 3, dodecylbenzene with a low viscosity (produced by Huels Co. in West Germany, viscosity 4.18 cst/40° C.) was added to the diisopropylnaphthalene mixtures used in Comparative Examples 1 and 3, and the initial color developing rates were measured according to the same method as in Example 4 except that 700 g of PSD-150 was dissolved in 9300 g of each solvent and that the coating amount onto the paper was changed to 4.0 g/m$^2$.

As can be seen from the results shown in Table 3 below, the diisopropylnaphthalene mixture with high viscosity which are inferior in initial color developing rate can also be controlled to have initial color developing rates comparable to the solvent of the present invention by controlling their viscosities. However, as the result of measurement of the color former-dissolving power of these solvents controlled in viscosity according to the same method as in Example 2, lowering in color former-dissolving power can be clearly seen as shown in Table 4. Thus, they are not suitable in a case where an ink with a high color former concentration is required.

TABLE 3

| Solvent | Dodecylbenzene added (%) | Viscosity cst/40° C. | Color developing rate after 30 seconds (%) |
|---|---|---|---|
| Comparative Example 1 | 55 | 5.24 | 40 |
| Comparative Example 3 | 45 | 5.24 | 41 |
| Example 1 | 0 | 5.24 | 43 |

TABLE 4

| Solvent | Color former dissolving power (g/ml) | | |
|---|---|---|---|
| | after 1 day | after 3 days | after 7 days |
| Comparative Example 1 | 7.2 | 2.8 | 2.1 |
| Comparative Example 3 | 7.9 | 3.6 | 2.9 |
| Example 1 | 24.5 | 16.4 | 15.2 |

In the following, the results of comparative tests for the known solvents for carbonless copying previously shown are given.

COMPARATIVE EXAMPLE 5

Organoleptic test of odor was conducted according to the same method as in Example 3 except for using 1-dimethylphenyl-1-phenylethane as the solvent. As a result, all of the forty members judged that odor was present, and 23 members of them complained of unpleasant feelings. From this result, 1-dimethylphenyl-1-phenylethane was judged to be unsuitable as a solvent for a carbonless copying paper in the field of use where odorless characteristic was thought much of.

COMPARATIVE EXAMPLE 6

Organoleptic test of odor was conducted according to the same method as in Example 3 except for using 1-dimethylphenyl-1-phenylmethane as the solvent. As a result, all of the forty members judged that odor was present, and 21 members of them complained of unpleasant feelings. From this result, 1-dimethylphenyl-1-phenylmethane was judged to be unsuitable as the solvent for a carbonless copying paper in the field of use where odorless characteristic was thought much of.

COMPARATIVE EXAMPLE 7

Organoleptic test of odor was conducted according to the same method as in Example 3 except for using partially hydrogenated terphenyl as the solvent. As a result, 31 members of the forty members judged that odor was present, and 21 members of them appealed unpleasant feelings. From this result, partially hydrogenated terphenyl was judged to be unsuitable as the solvent for a carbonless copying paper in the field of use where odorless characteristic was thought much of.

Further, a carbonless copying paper was prepared by use of partially hydrogenated terphenyl and the initial color developing performance of the carbonless copying paper using the partially hydrogenated terphenyl as the solvent in the same manner as in Example 4. As a result, no developed color density could be recognized after 30 seconds after color developing operation.

COMPARATIVE EXAMPLE 8

Following the same method as described in Example 4 except for using a butylbiphenyl mixture (Suresol 290, produced by KOCH chemical), initial color developing characteristic of this solvent was tested. As a result, the color developing rate after 30 seconds after the color developing operation was as low as 20%, thus found to be inferior compared with the solvent of the present invention.

As can be clearly seen from the above comparative examples, a carbonless copying paper which is substantially odorless, clean and pleasant during manufacturing or during use by users and which is endowed with both an excellent color developing characteristic and a high color former-dissolving power suitable for a system of coating a small amount of microcapsules, can be obtained by the solvent containing 2,7-diisopropylnaphthalene as the main component, according to the present invention.

What is claimed is:

1. A solvent composition for carbonless copying, comprising a mixture of diisopropylnaphthalene isomers having a content of 2,7-isomer of 50 wt.% or more.

2. A solvent composition according to claim 1, which has a dynamic viscosity of 5.8 cst/40° C. or less.

3. A solvent composition according to claim 1, wherein the content of 2,7-isomer in the mixture of diisopropylnaphthalene isomers is 55 wt.% or more.

4. A solvent composition according to claim 1, wherein the content of 2,7-isomer in the mixture of diisopropylnaphthalene isomers is 70 wt.% or more.

5. A solvent composition according to claim 1, wherein the total content of 1,4-, 1,5-, and 1,6-isomers in the mixture of diisopropylnaphthalene isomers is 15 wt.% or less.

6. A solvent composition according to claim 1, wherein the content of 2,6-isomer in the mixture of diisopropylnaphthalene isomers is 18 wt.% or less.

7. A solvent composition according to claim 1, wherein the content of 1,3-isomer in the mixture of diisopropylnaphthalene isomers is 7 wt.% or less.

8. A solvent composition according to claim 1, wherein the content of 1,7-isomer in the mixture of diisopropylnaphthalene isomers is 7 wt.% or less.

9. An ink composition for carbonless copying, comprising a solvent composition according to claim 1 and an electron-donating color former in an amount sufficient to provide a visible color through contact with an electron-accepting developer.

10. An ink composition according to claim 9, wherein the visible color is black.

11. An ink composition according to claim 9, wherein 3 to 20 parts by weight of the color former is contained per 100 parts by weight of a solvent composition.

12. An ink composition according to claim 8, which is microencapsulated.

* * * * *